United States Patent Office 3,781,203
Patented Dec. 25, 1973

3,781,203
THICKENED ACID COMPOSITIONS AND METHODS FOR MAKING SAME
Robert P. Clark, Skanesteles, N.Y., and Milton Freifeld, Easton, Pa., assignors to GAF Corporation, New York, N.Y.
No Drawing. Original application May 27, 1968, Ser. No. 732,111, now abandoned. Divided and this application Mar. 17, 1971, Ser. No. 125,422
Int. Cl. C08f 29/30; E21b 43/27
U.S. Cl. 252—8.55 C    6 Claims

ABSTRACT OF THE DISCLOSURE

A composition adapted for the thickening of aqueous acid compositions, such compositions so thickened, and a method for preparing such thickening compositions, such thickening compositions consisting essentially of the interaction product of (a) polyvinyl alcohol containing from 1 to 20% unsaponified 1 to 4 carbon atom fatty acid ester groups with (b) an equimolar interpolymer of an $\alpha,\beta$-unsaturated aliphatic dicarboxylic acid anhydride with an $\alpha$-olefinic comonomer selected from the group consisting of alkyl vinyl ethers, vinyl esters, $\alpha$-olefins, acrylic acids and acrylic acid esters, (a) and (b) being present in the molar ratio of 100:1 to 1:10.

RELATED APPLICATIONS

This application is a divisional application of Ser. No. 732,111, filed May 27, 1968, now abandoned.

The present invention relates to thickened acid compositions and, in particular, to acidic compositions of relatively high acid strength in a thickened form and to processes for making such compositions.

In many applications, it is very desirable to employ acid materials and particularly to employ such compositions in a safe and efficacious manner. Acids are commonly employed in the petroleum industry for oil well fractioning and drilling operations. Acidic materials are often used in oil well production fluids, in oil well stimulation fluids, in oil well completion fluids, and in water shut-off fluids. In many operations involving the use of metals, it is often desirable if not absolutely necessary, to pretreat or prepare the metal surfaces prior to various operations to be performed thereon. Thus it is common, in preparing metal surfaces prior to painting, annealing, anodizing, phosphatizing, welding, soldering and the like, to pretreat the metal with an acidic composition. In other areas such as in scale removal, highly acidic materials are conventionally employed. While but a few instances have been cited wherein highly acidic compositions are of tremendous importance in various industrial applications, it is manifest that many, many other areas are equally important in their use of acids and acidic compositions. In all of such uses, it is of course obvious that the handling of the acids is fraught with extreme danger, particularly to personnel employing same. In many applications, the use of acids would be extremely desirable but it is not feasible due to the fact that control of the acid is not possible. Thus, in any of the areas outlined above, particularly in metal treatments, it is almost impossible to safely handle metal objects in a vertical position with an acidic treatment of any kind. It thus becomes of extreme value, in all of the areas described above, and in any areas where an acidic material of high acid value is to be employed, to provide an acid composition which is both safe and efficacious in its use. The employment of acids and acidic composition in a thickened form would go far towards obviating the difficulties in handling acid materials and would provide an extremely safe means by which such compositions can be employed for the various uses indicated for them.

It is therefore an object of the present invention to provide thickened acids and acidic compositions which are particularly safe to handle by virtue of their flow characteristics.

It is another object of this invention to provide thickened acids and acid compositions containing inorganic salts, which compositions are characterized by a pH of less than about 3.

It is still another object of this invention to provide thickened acids, acidic compositions, and such compositions containing inorganic salts having a major content of acid and a pH of less than about 3 wherein an unique thickener is employed for such purposes.

It is still a further object of this invention to provide processes for thickening or gelling acids and acid compositions having high acid content and a pH below about 3.

It is still another object of this invention to provide new and outstanding thickening or gelling agents produced by the interaction of polyvinyl alcohol with interpolymers of $\alpha,\beta$-unsaturated aliphatic dicarboxylic acid anhydride and particularly interpolymers with copolymerizable, ethylenically unsaturated comonomers.

Other objects will appear hereinafter as the description proceeds.

It has now been discovered that acids, acidic compositions, and acid materials containing inorganic salts wherein the acid content provides a pH of less than about 3, can be thickened to provide a gel composition which is both stable and safe to handle, by the employment, as the thickening agent, of a polyvinyl alcohol adduct with interpolymers of an $\alpha,\beta$ unsaturated aliphated dicarboxylic acid with an $\alpha$-olefinic unsaturated comonomer.

The interpolymers which are employed to produce the polyvinyl alcohol adducts which are admirably suited to be employed as thickeners for the acid compositions of the present invention are well known interpolymers derived from, on the one hand, an $\alpha,\beta$-unsaturated aliphatic dicarboxylic acid or anhydride, and, on the other hand, an ethylenically unsaturated copolymerizable comonomer. Such interpolymers are generally produced with alternating moieties of the acid and the other comonomer resulting in a product having the respective comonomers present therein in a ratio of about 1:1. It is also possible to prepare interpolymers of the aforementioned products wherein the molar ratio of the two moieties present in the interpolymer varies from about 5:4 to about 4:5. Processes for producing such interpolymers are well known and form no part of the present invention, nor do the products of such interpolymerization procedures from any part of this invention.

The $\alpha,\beta$-unsaturated aliphatic dicarboxylic compounds which are contemplated herein as one of the components of the interpolymers employed as thickening agents, may be characterized in the anhydride form by the following general formula:

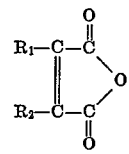

wherein $R_1$ and $R_2$ are independently selected from the group consisting of hydrogen, halogen, cyano, alkyl, aryl, alkaryl, aralkyl, cycloaliphatic and substituted forms of such organic substituents.

Compounds which are illustrative of the above general formula include maleic anhydride, chloromaleic anhydride, 2,3-dicoloromaleic anhydride, cyanomaleic anhydride, 2,3-dicyanomaleic anhydride, methyl maleic anhydride, 2,3-dimethyl maleic anhydride, ethyl maleic anhydride, propyl maleic anhydride, butyl maleic anhydride, 2,3-di-n-butyl maleic anhydride, phenyl maleic anhydride, benzyl maleic anhydride, cyclohexyl maleic anhydride, (p-methyl-phenyl) maleic anhydride, 2,3-diphenyl maleic anhydride, dodecyl maleic anhydride, stearyl maleic anhydride, diphenyl maleic anhydride, naphthyl maleic anhydride, o-chlorophenyl maleic anhydride, 3,4-dichlorophenyl maleic anhydride, 2,3-di-isooctyl maleic anhydride, and the like.

The α-olefinic copolymerizable comonomer which is employed to produce the interpolymers herein contemplated comprise any of the well-known ethylenically unsaturated compounds which are well known to those skilled in the art, to form interpolymers with the aforementioned dicarboxylic acid anhydrides. Examples of suitable ethylenically unsaturated comonomers include the general classes of alkyl vinyl ethers, wherein the alkyl moiety contains from one to about twenty carbon atoms, and preferably those wherein the alkyl group contains from one to four carbon atoms, as well as α-olefins such as ethylene, propylene, butylene and the like; vinyl esters such as vinyl chloride, vinyl acetate, vinyl propionate and the like; acrylonitrile, acrylamide, acrylic acid; acrylic esters such as methyl acrylate, ethyl acrylate, isopropyl acrylate, and the like; methacrylic acid, and the esters thereof; methacrylonitrile; and vinyl ketones such as methyl vinyl ketone, and other alkyl vinyl ketones containing up to about twenty carbon atoms in the alkyl moiety.

The interpolymers which are useful to produce the thickened acid compositions of this invention may be characterized in terms of their molecular weight; from several hundred, i.e., about 300 on the low side, to upwards of several million. Viscosity measurements are commonly used as an indication of the average molecular weight of polymers. The $k$ value (Fikentscher) of any polymer, or mixture of polymers, is calculated from viscosity data, and is useful as an indication of the average molecular weight of the composition. The determination of the $k$ value is fully described in Modern Plastics, vol. 23, No. 3, pp. 175–61, 212, 214, 216 and 218 (1945) and is defined as 1,000 times $k$ in the empirical relative viscosity equation:

$$\log_{10} \eta_{rel.} = \frac{75_k{}^2}{1+1.5_k C} + k$$

wherein C is the concentration in grams per 100 cc. polymer solution and $\eta_{rel.}$ is the ratio of viscosity of solution to that of pure solvent. The $k$ values are reported as 1000 times the calculated viscosity coefficient in order to avoid the use of decimals. For the purpose of the present invention, there may be employed those polymeric substances having a $k$ value of about 10 to 200, and preferably, from about 15 to 100. The specific viscosities may typically range from about 0.1 to about 10.0. The $k$ values and specific viscosities ($\eta_{sp.}$) are interconvertible and are related through relative viscosity ($\eta_{rel.}$). Thus, when viscosity measurements are taken on solutions which have a concentration of 1.00 g. polymer per deciliter of solution at 25° C. (c.=1), the relations are as follows:

(1) $\eta_{rel.} = \eta_{sp.} + 1$
(2) Relative viscosity=specific viscosity+1
(3) Relative viscosity=$10[0.001k+0.000075k^2/1+0.0015k]$
(4) $\eta_{sp.} = 1+10[0.001k+0.000075k^2/1+0.0015k]$ Relative viscosity, specific viscosity, and $k$ are dimensionless, whereas inherent viscosity (log $\eta_{rel.}+C$) and intrinsic viscosity (the limit of inherent viscosity as C approaches) have the dimensions of dilution, that is, the reciprocal of concentration. Intrinsic viscosity and $k$ are intended to be independent of concentration.

As described above, the thickening or gelling agents are provided by the interaction of a water-soluble polyvinyl alcohol-containing product, on the one hand, with the aforedescribed interpolymers. The desired reaction products are water-soluble materials which, in view of the wide ranges in molecular weights of the reactants and their ratios, will vary widely in their thickening properties. In general, however, comparable thickening can be obtained by varying the concentration of thickening agents used.

In preparing the thickening or gelling agents of, and usable in, this invention, wide latitude in the ratio and concentration of reactants may be resorted to, as well as in selecting the reaction conditions of time and temperature. Generally, equimolar amounts of polyvinyl alcohol and anhydride interpolymer product the optimum products, although satisfactory, if not excellent, products are also prepared wherein the molar ratio of polyvinyl alcohol to interpolymer varies from 100:1 to 1:10. Reaction between the interpolymer and polyvinyl alcohol proceeds satisfactorily at room temperature with elevated temperatures up to reflux of an aqueous reaction mass also being suitable. Moderately elevated temperatures are preferred (i.e., 100–150° F.) to produce a satisfactory product at a minimum time of reaction. While the formation of the gelling agent may be conducted in non-aqueous systems and even in the solid state, it is preferred to prepare the thickening composition in an aqueous medium and, most particularly, in the presence of the aqueous acid and/or salt solution where thickening of such systems is the sought-for end. By the use of an aqueous reaction medium it is also simpler to control the production of desired water-soluble reaction products since in such a medium, the reaction appears to be self-limiting and will not proceed beyond the water-soluble stage.

The thickened acid compositions of this invention may vary from low to medium to high viscosity fluids to very firm gels (i.e., 10 cps. to >100,000 cps.) and this variable characteristic is most dependent upon the solids concentration of the thickener in the aqueous acid composition. Generally, at 1% solids level, many acid compositions are highly viscous, others firm gels. At higher solids content, the thickening action is more pronounced. As a convenient guide, it has been found that thickened, stable, acid compositions can be produced using from about 1% to 5% by weight of thickening agents based on the weight of the acid composition, although variations from such amounts are contemplated.

The polyvinyl alcohol component of the gelling agents of this invention are well-known commercial products of varying molecular weight and degree of hydrolysis (these polymers are generally prepared by hydrolysis of polyvinyl acetate). For the purposes of the present invention, the molecular weight of the polyvinyl alcohol may range from about 20,000 to the highest molecular weight products currently available (i.e., about 250,000–400,000) and the degree of hydrolysis from about 80% to 99%. The 100% hydrolyzed polymer (no acetate groups) has been found to produce an inferior product of poor thickening power with acids. Below about 80% hydrolysis, the products are also undesirable, and do not yield stable, thickened acid compositions.

The following examples will serve to illustrate the present invention without being deemed limitative thereof. Parts are by weight unless otherwise indicated.

EXAMPLE 1

To a solution of 66.7 g. of aqueous 37% HCl in 28.3 g. of water, there are added 2.5 g. of powdered polyvinyl alcohol (88% hydrolyzed from polyvinylacetate—M.W. 170,000–220,000) and then 2.5 g. of an equimolar interpolymer of vinyl methyl ether with maleic anhydrided (specific viscosity=3.5). The mixture is stirred at room temperature and gradually, a clear flowable gel is produced. The gel is stable after 6 months storage.

EXAMPLE 2

(Comparative)

The procedure of Example 1 is repeated except that in place of the reaction product (5 g. solids) there is used in one instance, 5 g. of the same polyvinyl alcohol and, in a second instance, 5 g. of the same interpolymer. In each case, no change in the original aqueous acid is observed during a 6-month period. (The acid remains fluid.)

EXAMPLE 3

Example 1 is repeated, using 2, 3, and 4 times the amount of polyvinyl alcohol and interpolymer. Stable gels result, in each instance.

EXAMPLE 4

(A) Example 1 is repeated, using 54.1 g. acid and 44.9 g. water, and adding 0.5 g. each of polyvinyl alcohol and the interpolymer. A clear, stable gel results, which is still stable after 6 months. (B) Using 3% product solids (i.e., 1.5% of alcohol, and 1.5% interpolymer) also results in a clear stable gel.

EXAMPLE 5

(Comparative)

Repeating Example 4(B), but using a 75% hydrolyzed polyvinyl alcohol (from polyvinyl acetate), fails to yield any gel and practically no change in the viscosity of the aqueous acid.

EXAMPLE 6

Example 4 is repeated, using a lower acid concentration (i.e., 40.5 g. acid, and 58.5 g. water). After 6 months, (A) is a viscous fluid and (B) is a firm gel.

EXAMPLE 7

(Comparative)

Example 5 is repeated using the acid concentration of Example 6. A slight increase in viscosity is noted initially (120 hours) but after several weeks, and up to 6 months, the compositions are as in Example 5.

EXAMPLE 8

To a 15% aqueous hydrochloric acid solution (40.5 g. of 37% acid and 55 g. water) containing 2% by weight of calcium chloride, there are added 1.3 g. each of the polyvinyl alcohol and interpolymer of Example 1. A clear, viscous solution is obtained, which shortly becomes a gel and this gel is stable after 4 months storage.

EXAMPLE 9

To 95 g. of an 80% $H_3PO_4$ aqueous solution, there are added 2.5 g. each of the same polyvinyl alcohol and interpolymer as used in Example 1. A stable gel results which after 6 months storage is still a stable gel.

EXAMPLE 10

Example 9 is repeated using as the acids, the following:

(a) 60 g. glacial acetic and 35 g. water
(b) 30 g. glacial acetic and 65 g. water.

Stable gels result.

EXAMPLE 11

Example 1 is repeated except that the polyvinyl alcohol is 99% hydrolyzed. A similar gel as in Example 1 is produced.

EXAMPLE 12

Example 1 is repeated, using the following weight ratios of polyvinyl alcohol to interpolymer:

(a) 1:30
(b) 1:10
(c) 1:8
(d) 1:7
(e) 1:6
(f) 1:5
(g) 1:4
(h) 1:3 (approximately equimolar)
(i) 1:2
(j) 2:1
(k) 2:1
(l) 4:1
(m) 10:1
(n) 30:1

Increased viscosities are obtained in all cases with stable gels in most instances.

EXAMPLE 13

Example 1 is once more repeated except that the interpolymer is varied as follows:

(a) 1:1 interpolymer $\mu_{sp.}=0.9$
(b) 1:1 interpolymer $\mu_{sp.}=1.5$
(c) 1:1 interpolymer $\mu_{sp.}=2.3$
(d) 1:1 interpolymer $\mu_{sp.}=6.0$ Excellent, stable gels are produced in each case.

EXAMPLE 14

Example 1 is repeated, using the following interpolymers:

(a) ethyl vinyl ether-maleic anhydride (1:1 mol ratio: $\mu_{sp.}=1.5$)
(b) methyl vinyl ether-chloromaleic anhydride (4:5 mol ratio: $\mu_{sp.}=0.8$)
(c) methyl vinyl ether-methyl maleic anhydride (5:4 mol ratio: $\mu_{sp.}=1.8$)
(d) methyl vinyl ether-phenyl maleic anhydride (1:1 mol ratio: $\mu_{sp.}=1.8$)
(e) vinyl acetate-maleic anhydride (1:1 mol ratio: $\mu_{sp.}=1.4$)
(f) methyl acrylate-maleic anhydride (1:1 mol ratio: $\mu_{sp.}=0.6$)
(g) acrylamide - maleic anhydride (1:1 mol ratio: $\mu_{sp.}=1.1$)
(h) acrylonitrile - maleic anhydride (1:1 mol ratio: $\mu_{sp.}=2.0$).

Excellent, stable viscous compositions are obtained in each instance.

EXAMPLE 15

Example 1 is repeated except that the composition is prepared at 140° F. Excellent thickening results.

EXAMPLE 16

Example 12(m) is repeated at 16° F. Excellent thickening occurs.

EXAMPLE 17

Example 9 is again repeated, except that 4.5 g. of polyvinyl alcohol and 0.5 g. of interpolymer are used and the acid is refluxed. Excellent thickening occurs.

EXAMPLE 18

Example 8 is repeated, employing the following salts in place of calcium chloride:

(a) 1% sodium chloride
(b) 5% sodium chloride
(c) 2% magnesium chloride
(d) 3% sodium sulfate
(e) 2% potassium nitrate
(f) 2% sodium acetate.

The results are similar to Example 8.

EXAMPLE 19

Example 1 is repeated, using a polyvinyl alcohol which is only 80% hydrolyzed (20% residual acetate groups) and has a molecular weight of 20,000. A stable gel results.

EXAMPLE 20

Example 1 is again repeated, using a 95% hydrolyzed polyvinyl alcohol (5% acetate groups) having a molecular weight of about 400,000. The results are comparable to Example 1.

In each of the foregoing examples, where the thickened acid compositions are highly acid (i.e., less than pH=3) and may, or may not contain added electrolyte (e.g. salts) excellent thickening has been demonstrated employing the various polyvinyl alcohol interaction products with the exemplified interpolymers, the latter being merely representative of the described class of interpolymers. The interpolymers actually exemplified represent products with $k$ values of from about 15 to about 100, although it is understood that variations may be resorted to in this characteristic without substantial change in the results achieved. Similar variations may also be made in accordance with the teachings herein, with regard to the other variables or parameters of this invention without departing from the excellent results, sphere and scope of the invention.

What is claimed is:

1. A thickened aqueous acid composition having a thickening agent therein and having a pH below about 3 comprising:
   a strongly acid aqueous solution wherein said acid is selected from the group consisting of hydrochloric, phosphoric and acetic containing as a thickening agent a composition comprising the interaction product of
   (a) polyvinyl alcohol containing from 1 to 20% unsaponified 1 to 4 carbon atom fatty acid ester groups with
   (b) an equimolar interpolymer, having a specific viscosity of 0.1 to 10.0 of an $\alpha,\beta$-unsaturated aliphatic dicarboxylic acid anhydride of the formula

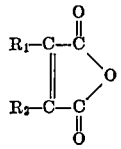

wherein $R_1$ and $R_2$ are independently selected from the group consisting of hydrogen, halogen, cyano, alkyl, aryl, alkaryl, aralkyl and cycloaliphatic with an $\alpha$-olefinic comonomer selected from the group consisting of alkyl vinyl ethers, vinyl esters, $\alpha$-olefins, acrylic acid and acrylic acid esters, (a) and (b) being present in the molar ratio of 100:1 to 1:10.

2. A thickened acid composition as defined in claim 1 wherein component (b) is a methyl vinyl ether-maleic anhydride interpolymer.

3. A thickened acid composition as defined in claim 1 wherein component (a) is derived from polyvinyl acetate.

4. A thickened aqueous acid composition consisting essentially of a composition as defined in claim 1 containing about 1 to 5% by weight, of a salt selected from the group consisting of $CaCl_2$, $NaCl$, $MgCl_2$, $Na_2SO_4$, $KNO_3$ and $CH_3COONa$.

5. A method for increasing the viscosity of a strongly acid aqueous solution wherein said acid is selected from the group consisting of hydrochloric, phosphoric and acetic comprising: adding a thickening amount of components (a) and (b) as defined in claim 1 to said strongly acid aqueous solution and reacting said components in said solution to form an interaction product thereof, thereby increasing the viscosity of said solution.

6. A method as defined in claim 5 wherein said component (b) is a methyl vinyl ether-maleic anhydride interpolymer.

References Cited

UNITED STATES PATENTS

| | | | |
|---|---|---|---|
| 2,609,350 | 9/1952 | Spatt | 260—874 |
| 2,763,326 | 9/1956 | Cardwell et al. | 252—8.55 X |
| 2,824,833 | 2/1958 | Cardwell et al. | 252—8.55 |
| 2,596,137 | 5/1952 | Fast | 252—8.55 X |
| 3,153,450 | 10/1964 | Foster et al. | 252—8.55 X |
| 3,079,336 | 2/1963 | Stright et al. | 252—8.55 |

OTHER REFERENCES

Elvanol Polyvinyl Alcohol, publication by Du Pont, p. 2.

HERBERT B. GUYNN, Primary Examiner

U.S. Cl. X.R.

117—49; 166—307; 252—8.55 R, 87, 316; 260—29.6 R, 29.6 WA, 874